US006643510B2

(12) United States Patent
Taylor

(10) Patent No.: US 6,643,510 B2
(45) Date of Patent: Nov. 4, 2003

(54) MOBILE PLATFORM REAL TIME AVAILABILITY AND CONTENT SCHEDULING SYSTEM AND METHOD

(75) Inventor: Scott P. Taylor, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/941,353

(22) Filed: Aug. 29, 2001

(65) Prior Publication Data

US 2003/0045286 A1 Mar. 6, 2003

(51) Int. Cl.[7] .................................................. H04Q 7/20
(52) U.S. Cl. ........................................ 455/431; 455/463
(58) Field of Search ................................ 455/431, 427, 455/430, 12.1, 13.1, 98, 428, 429, 424, 463, 426, 447, 448; 709/217, 227, 229; 379/28, 88.17, 88.2

(56) References Cited

U.S. PATENT DOCUMENTS

| | | | |
|---|---|---|---|
| 5,918,175 A | * | 6/1999 | Tayloe et al. ................ 455/427 |
| 6,173,159 B1 | | 1/2001 | Wright et al. |
| 6,201,797 B1 | * | 3/2001 | Leuca et al. ................ 370/316 |
| 6,257,526 B1 | * | 7/2001 | Taormina et al. ........... 244/158 |
| 6,298,120 B1 | * | 10/2001 | Civanlar et al. ......... 379/88.17 |
| 6,321,084 B1 | * | 11/2001 | Horrer ......................... 455/431 |
| 6,339,707 B1 | * | 1/2002 | Wainfan et al. ............. 455/427 |
| 6,392,692 B1 | * | 5/2002 | Monroe ....................... 348/143 |

FOREIGN PATENT DOCUMENTS

| | | |
|---|---|---|
| WO | WO 98/26522 | 6/1998 |
| WO | WO 00/14987 | 3/2000 |
| WO | WO 00/38352 | 6/2000 |

OTHER PUBLICATIONS

International Search Report dated Aug. 29, 2001 for PCT/US02/23225, 4 pages.

* cited by examiner

Primary Examiner—William Trost
Assistant Examiner—Nghi H. Ly
(74) Attorney, Agent, or Firm—Harness Dickey & Pierce P.L.C.

(57) ABSTRACT

A system and method for managing the transmission of data content, in real time, to a plurality of mobile platforms operating within a given coverage region. The system makes use of a database which includes an identifier which uniquely identifies each mobile platform authorized to access the system, together with the specific types of data content to be provided to, and level of quality of service to be accorded to, each mobile platform. The system and method allows the delivery of data content to each one of a plurality of mobile platforms receiving data content to be better managed, in real time, whenever a mobile platform is available to receive data content.

8 Claims, 3 Drawing Sheets

MOBILE PLATFORM REAL TIME AVAILABILITY AND CONTENT SCHEDULING SYSTEM AND METHOD

FIELD OF THE INVENTION

The present invention relates to systems and methods for supplying data and information to a mobile platform, such as an aircraft, from a base station, and more particularly to a system and method for determining which specific types of data and/or information are required of each one of a number of mobile platforms in communication with the base station.

BACKGROUND OF THE INVENTION

In a communication system in which various forms of data and/or information need to be supplied to a plurality of mobile platforms, in real time, where each mobile platform only receives predetermined, specific types of data and/or information, it is necessary to provide some form of system and/or method for enabling the base station to determine exactly what type of data and/or information needs to be supplied to each mobile platform which is communicating with it. For example, assuming the mobile platforms are commercial aircraft operated by commercial airlines, then the airline may determine that a particular aircraft should only receive advertising content. Alternatively, the airline may determine that movies or other digital media is to be provided to the aircraft. Accordingly, the data/content requirements will vary from aircraft to aircraft depending upon what content has been selected by the airline operating the aircraft.

Another factor that needs to be considered is the "quality of service" that needs to be provided to each mobile platform in communication with the base station. For example, it may be determined that certain types of data and/or information are essential to the aircraft's operation. Alternatively, it may be predetermined that other types of content, such as full length feature movies, do not represent high priority data content. Thus, each aircraft may be designated to receive one or more different types of data content having different levels of importance. It is therefore necessary for a communication system to be able to determine what level of "quality of service" needs to be applied to each specific form of data content being transmitted to the aircraft such that data content considered to be essential to aircraft operation is given priority and additional efforts, if needed, are used to deliver the more important data content to the aircraft.

Still further factors that need to be considered are:

what mobile platforms require what types of data content (i.e., web content, movies, stock data, e-commerce, software updates, etc.);

the size of that data to be delivered to each mobile platform or group of mobile platforms currently being serviced;

the priority of that data to be delivered to each mobile platform or group of mobile platforms currently being serviced;

the urgency of the data to be delivered to each mobile platform or group of mobile platforms currently being serviced; and what data has already been delivered to each mobile platform or group of mobile platforms.

Each category of data needs to be collected and summarized for scheduling the delivering of data to mobile platforms simultaneously, at one time, or to a single mobile platform.

Therefore, it is a principal object of the present invention to provide a system and method for managing the data content and information supplied to a number of mobile platforms operating within a given coverage region, where all of the mobile platforms are in communication with a base station, and where each mobile platform requires different forms of data content, as well as potentially different levels of quality of service to be used in supplying the information content to it.

It is a further object of the present invention to provide such a system and method as described immediately above, and further wherein the system and method monitors the availability of each mobile platform to determine immediately when each mobile platform is "on line" and ready to receive its data content.

SUMMARY OF THE INVENTION

The above and other objects are provided by a mobile platform real time availability and content scheduling system and method in accordance with preferred embodiments of the present invention. The system and method, in one preferred form, makes use of information provided by an operator of a mobile platform, for example, a commercial airline, as to what specific types of data/information content is to be supplied to a particular mobile platform by a base station of the system. This information also includes a "quality of service" designation which indicates to the base station the level of importance being attached to the content. A data center of the base station collects this information from the operators of each mobile platform that will be receiving content from the base station.

The system and method also includes a link management system which provides information to the data center of the base station as to which mobile platforms are currently available to receive content. From this, the data center of the base station determines which types of content are to be transmitted to each specific mobile platform, together with the level of quality of service to be applied to the content transmitted to each mobile platform.

The system and method of the present invention thus manages the transmission of specific types of data content to each mobile platform in accordance with a specific level of quality of service requested by each mobile platform.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
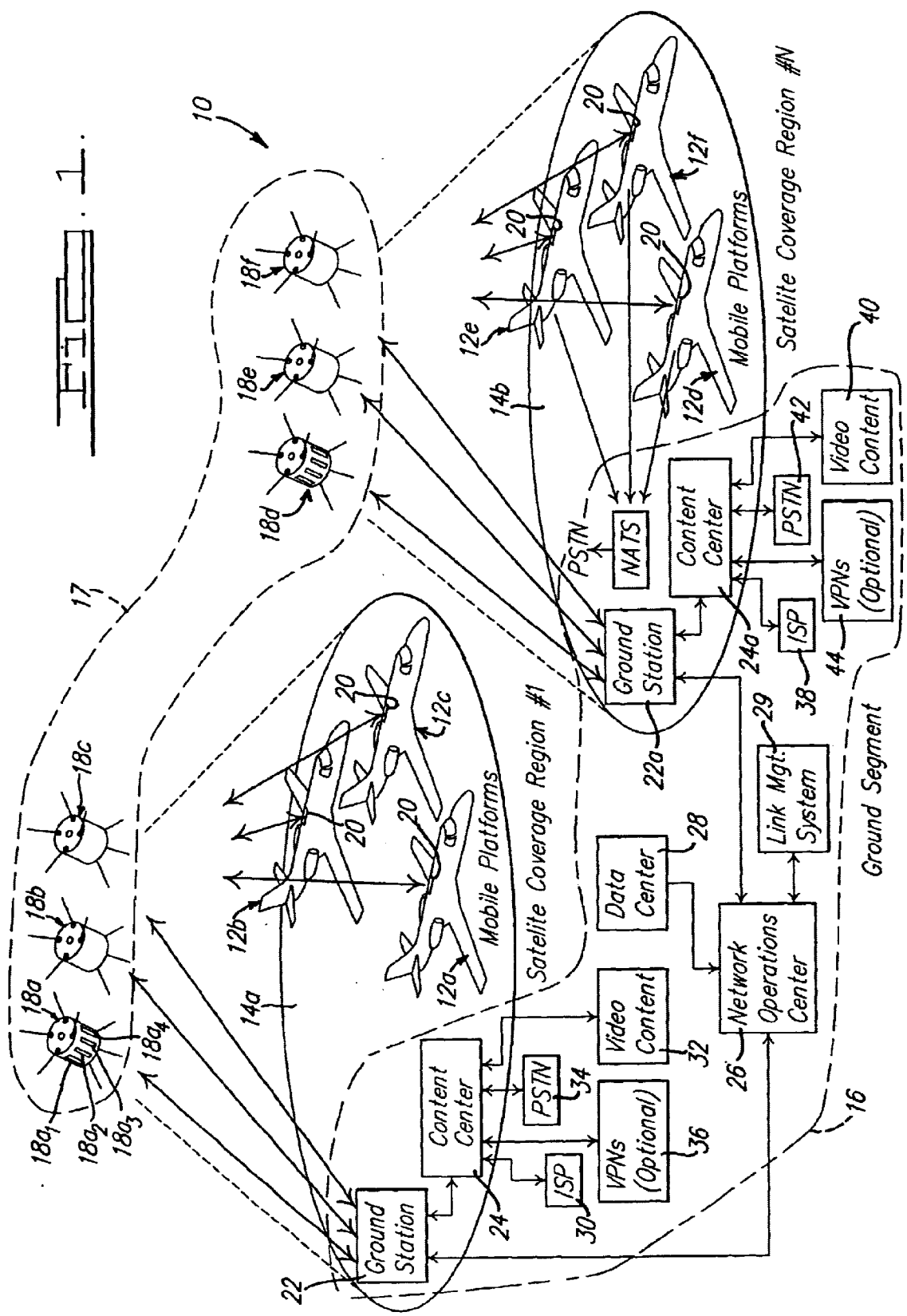
FIG. 1 is a block diagram view of a system in accordance with a preferred embodiment of the present invention.

Referring to FIG. 1, there is shown a system 10 in accordance with a preferred embodiment of the present invention for providing data content to and from a plurality of moving platforms 12a–12f in one or more distinct coverage regions 14a and 14b. The system 10 generally comprises a ground segment 16, a plurality of satellites 18a–18f forming a space segment 17, and a mobile system 20 disposed on each moving platform 12. The moving platforms could comprise aircraft, cruise ships or any other moving vehicle. Thus, the illustration of the moving platforms 12 as aircraft in the figures herein, and the reference to the mobile platforms as aircraft throughout the following description should not be construed as limiting the applicability of the system 10 to only aircraft.

The space segment 17 may include any number of satellites 18 in each coverage region 14a and 14b needed to provide coverage for each region. Satellites 18a, 18b, 18d and 18e are preferably Ku or Ka-band satellites. Satellites 18c and 18f are Broadcast Satellite Services (BSS) satellites. Each of the satellites 18 are further located in a geostationary orbit (GSO) or a non-geostationary orbit (NGSO). Examples of possible NGSO orbits that could be used with this invention include low Earth orbit (LEO), medium Earth orbit (MEO) and highly elliptical orbit (HEO). Each of the satellites 18 includes at least one radio frequency (RF) transponder, and more preferably a plurality of RF transponders. For example satellite 18a is illustrated having four transponders $18a_1$–$18a_4$. It will be appreciated that each other satellite 18 illustrated could have a greater or lesser plurality of RF transponders as required to handle the anticipated number of mobile platforms 12 operating in the coverage area. The transponders provide "bent-pipe" communications between the aircraft 12 and the ground segment 16. The frequency bands used for these communication links could comprise any radio frequency band from approximately 10 MHz to 100 GHz. The transponders preferably comprise Ku-band transponders in the frequency band designated by the Federal Communications Commission (FCC) and the International Telecommunications Union (ITU) for fixed satellite services FSS or BSS satellites. Also, different types of transponders may be employed (i.e., each satellite 18 need not include a plurality of identical types of transponders) and each transponder may operate at a different frequency. Each of the transponders $18a_1$–$18a_4$ further include wide geographic coverage, high effective isotropic radiated power (EIRP) and high gain/noise temperature (G/T).

With further reference to FIG. 1, the ground segment 16 includes a ground station 22 in bi-directional communication with a content center 24 and a network operations center (NOC) 26. The NOC 26 is in communication with a data center 28 and a link management system 29. The data center 28 includes scheduling software for creating a database of the different types of data content that will be provided to each of the aircraft 12, as well as information indicative of the level of "quality of service" that is to be applied to the data content transmitted to each aircraft 12. In this regard it will be appreciated that the term "data content" is used generically to represent any data or digital information to be transmitted to any of the aircraft 12.

The quality of service information comprises a designation indicative of the importance placed on the data content to be transmitted to a given aircraft 12. The importance is determined by the operator of the mobile platform, which in this example would be an airline company. The airline company may determine that Internet data should be transmitted with a higher level of quality of service than, for example, movies or television programming being supplied to the aircraft 12. The higher the level of quality of service indicated for a given aircraft 12, the greater the effort that will be made in delivering the data content to that aircraft. For example, a high level of quality of service may require the ground system 16 to establish a TCIP connection (i.e., a point-to-point connection) to repeatedly attempt to transmit data content to a given aircraft 12 until the aircraft acknowledges that the data content has been properly received. A lower level of quality of service might require the ground system 16 to attempt to multicast the data content at periodic intervals, if the initial transmission of the data content was not received by the designated aircraft 12.

The data center 28 will also receive information from the operator of each aircraft 12 of an identifying code or number for each aircraft. With commercial aircraft, this code is preferably the tail number of the aircraft. However, it will be appreciated that virtually any form of code which uniquely identifies the mobile platform could be used. The tail number is maintained in the database managed by the data center 28 such that the database includes a listing of the tail number (or other identifying information) of each aircraft 12 that potentially could access the system 10, as well as the specific type of data content designated for each particular aircraft 12 and the level of quality of service to be provided to each particular aircraft. This information could be provided by the operator (e.g., airline company) of each mobile platform via a website in communication with the data center 28 where the operator could specify which aircraft is to receive what type of data content, and at what level of quality of service.

The link management system 29 is used to maintain a database of which aircraft 12 have signed on to the system 10 and are available to receive data content. The link management system 29 also tracks when aircraft 12 have signed off from the system 10 or are leaving the coverage region.

With further reference to FIG. 1, a second ground station 22a located in the second coverage area 14b may be used if more than one distinct coverage area is required for the service. In this instance, ground station 22a would also be in bi-directional communication with the NOC 26 via a terrestrial ground link or any other suitable means for establishing a communication link with the NOC 26. The ground station 22a would also be in bi-directional communication with a content center 24a. For the purpose of discussion, the system 10 will be described with respect to the operations occurring in coverage region 14a. However, it will be understood that identical operations relative to the satellites 18d-18f occur in coverage region 14b. It will also be understood that the invention may be scaled to any number of coverage regions 14 in the manner just described.

The ground station 22 comprises an antenna and associated antenna control electronics needed for transmitting data content to the satellites 18a and 18b. The antenna of the ground station 22 may also be used to receive data content transponded by the transponders $18a_1$–$18a_4$ originating from each mobile system 20 of each aircraft 12 within the coverage region 14a. The ground station 22 may be located anywhere within the coverage region 14a. Similarly, ground station 22a, if incorporated, can be located anywhere within the second coverage area 14b.

The content center 24 is in communication with a variety of external data content providers and controls the transmission of video and data information received by it to the ground station 22. Preferably, the content center 24 is in contact with an Internet service provider (ISP) 30, a video content source 32 and a public switched telephone network (PSTN) 34. Optionally, the content center 24 can also communicate with one or more virtual private networks (VPNs) 36. The ISP 30 provides Internet access to each of the occupants of each aircraft 12. The video content source 32 provides live television programming, for example, Cable News Network® (CNN) and ESPN®. The NOC 26 performs traditional network management, user authentication, accounting, customer service and billing tasks. The content center 24a associated with the ground station 22a in the second coverage region 14b would also preferably be in communication with an ISP 38, a video content provider 40, a PSTN 42, and optionally a VPN 44.

Figure 2:
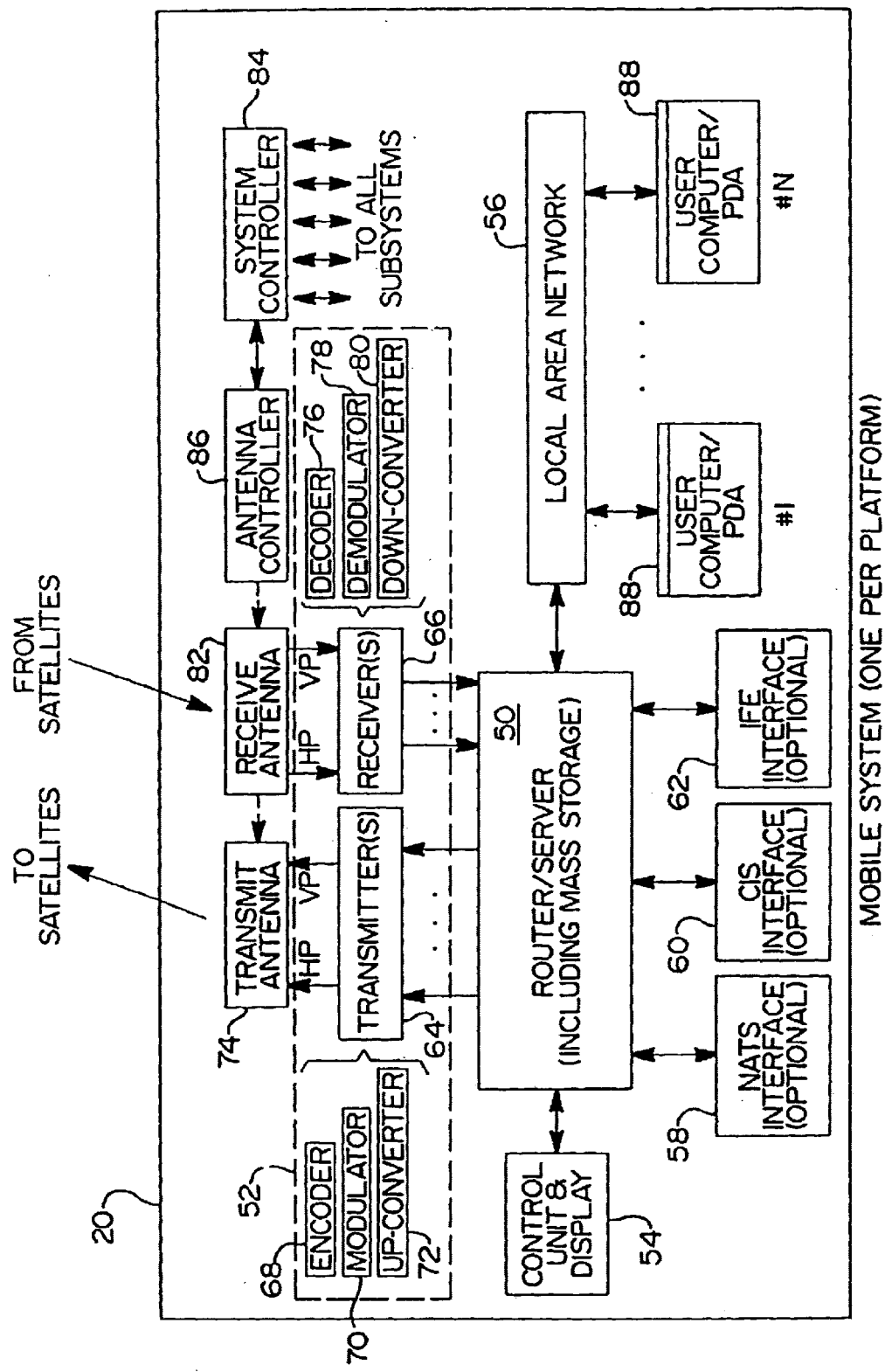
FIG. 2 is a detailed block diagram of the mobile terminal carried by each mobile platform.

Referring now to FIG. 2, the mobile system 20 disposed on each aircraft 12 will be described in greater detail. Each mobile system 20 includes a data content management system in the form of a router/server 50 (hereinafter "server") which is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an Up-converter 72 for encoding, modulating and up-converting data content signals from the server 50 to a transmit antenna 74. The receiver subsystem 66 includes a decoder 76, a demodulator 78 and a down-converter 80 for decoding, demodulating and down-converting signals received by the receive antenna 82 into baseband video and audio signals, as well as data signals. While only one receiver subsystem 66 is shown, it will be appreciated that a plurality of receiver subsystems 66 will typically be included to enable simultaneous reception of RF signals from a plurality of RF transponders. If a plurality of receiver subsystems 66 are shown, then a corresponding plurality of components 76–80 will also be required.

The signals received by the receiver subsystem 66 are then input to the server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 2, the local area network (LAN) 56 is used to interface the server 50 to a plurality of access stations 88 associated with each seat location on board the aircraft 12a. Each access station 88 can be used to interface the server 50 directly with a user's laptop computer, personal digital assistant (PDA) or other personal computing device of the user. The access stations 88 could also each comprise a seat back mounted computer/display. The LAN 56 enables bi-directional communication of data between the user's computing device and the server 50 such that each user is able to request a desired channel of television programming, access a desired website, access his/her email, or perform a wide variety of other tasks independently of the other users on board the aircraft 12.

The receive and transmit antennas 82 and 74, respectively, may comprise any form of steerable antenna. In one preferred form, these antennas comprise electronically scanned, phased array antennas. Phased array antennas are especially well suited for aviation applications where aerodynamic drag is important considerations. One particular form of electronically scanned, phased array antenna suitable for use with the present invention is disclosed in U.S. Pat. No. 5,886,671, assigned to The Boeing Co., and hereby incorporated by reference.

Referring further to FIG. 1, in operation of the system 10, the data content is preferably formatted into Internet protocol (IP) packets before being transmitted by either the ground station 22, or from the transmit antenna 74 of each mobile system 20. For the purpose of discussion, a transmission of data content in the form of IP packets from the ground station 22 will be referred to as a "forward link" transmission. IP packet multiplexing is also preferably employed such that data content can be provided simultaneously to each of the aircraft 12 operating within the coverage region 14a using unicast, multicast and broadcast transmissions.

The IP data content packets received by each of the transponders $18a_1$–$18a_4$ are then transponded by the transponders to each aircraft 12 operating within the coverage region 14a. While multiple satellites 18 are illustrated over coverage region 14a, it will be appreciated that at the present time, a single satellite is capable of providing coverage to an area encompassing the entire continental United States. Thus, depending upon the geographic size of the coverage region and the mobile platform traffic anticipated within the region, it is possible that only a single satellite incorporating a single transponder may be needed to provide coverage for the entire region. Other distinct coverage regions besides the continental United States include Europe, South/Central America, East Asia, Middle East, North Atlantic, etc. It is anticipated that in service regions larger than the continental United States, that a plurality of satellites 18 each incorporating one or more transponders may be required to provide complete coverage of the region.

The receive antenna 82 and transmit antenna 74 are each preferably disposed on the top of the fuselage of their associated aircraft 12. The receive antenna 74 of each aircraft receives the entire RF transmission of encoded RF signals representing the IP data content packets from at least one of the transponders $18a_1$–$18a_4$. The receive antenna 82 receives horizontally polarized (HP) and vertically polarized (VP) signals which are input to at least one of the receivers 66. If more than one receiver 66 is incorporated, then one will be designated for use with a particular transponder $18a_1$–$18a_4$ carried by the target satellite 18 to which it is pointed. The receiver 66 decodes, demodulates and down-converts the encoded RF signals to produce video and audio signals, as well as data signals, that are input to the server 50. The server operates to filter off and discard any data content not intended for users on the aircraft 12 and then forwards the remaining data content via the LAN 56 to the appropriate access stations 88. In this manner, each user receives only that portion of the programming or other information previously requested by the user. Accordingly, each user is free to request and receive desired channels of programming, access email, access the Internet and perform other data transfer operations independently of all other users on the aircraft 12a.

An advantage of the present invention is that the system 10 is also capable of receiving DBS transmissions of live television programming (e.g., news, sports, weather, entertainment, etc.). Examples of DBS service providers include DirecTV® and Echostar®. DBS transmissions occur in a frequency band designated for broadcast satellite services (BSS) and are typically circularly polarized in North America. Therefore, a linear polarization converter may be optionally added to receive antenna 82 for receiving broadcast satellite services in North America. The FSS frequency band that carries the data services and the BSS frequency band that carries DBS transmissions are adjacent to each other in the Ku-band. In one optional embodiment of the system 10, a single Ku-band receive antenna can be used to receive either DBS transmissions from DBS satellites 18c and 18f in the BSS band or data services in the FSS band from one of the FSS satellites 18a or 18b, or both simultaneously using the same receive antenna 82. Simultaneous reception from multiple satellites 18 is accomplished using a multi-beam receive antenna 82 or by using a single beam receive antenna 82 with satellites co-located in the same geostationary orbit slot.

Rebroadcast television or customized video services are received and processed by the mobile system 20 in exactly the same way. Rebroadcast or customized video content is obtained from the video content source 32 and transmitted via the ground station 22 to the FSS satellites 18a and 18b. The video content is appropriately encoded for transmission by the content center 24 before being broadcast by the ground station 22. Some customization of the rebroadcast content may occur on the server 50 (FIG. 2) of the mobile system 20 to tailor advertisements and other information content to a particular market or interest of the users on the aircraft 12.

The bulk of data content provided to the users on each aircraft 12 is provided by using a private portal data content. This is implemented as a set of HTML pages housed on the server 50 of each mobile system 20. The content is kept fresh by periodically sending updated portions from a ground-based server located in content center 24, and in accordance with a scheduling function controlled by the NOC 26 of the ground segment 16. The server 50 can readily be configured to accept user log-on information to support authentication and authorization of users and to keep track of user and network accounting information to support a billing system. The authorization and accounting systems can be configured to communicate with the ground segment 16 to transfer accumulated data at convenient intervals to the NOC 26.

The system 10 of the present invention also provides direct Internet connectivity via satellite links for a variety of purposes, such as when a user on board the aircraft 12 desires to obtain data content that is not cached on server 50, or as an avenue for content sources to provide fresh content for the private portals. The server may be used to cache the most frequently requested web pages as well as to host a domain name system (DMS) look-up table of the most frequently accessed domains. The DMS look-up table is preferably maintained by the content center 24 and is periodically updated on the mobile system 20. Refreshing of the cached content of the portal may be accomplished by in-flight, periodic "pushed" cache refresh or at the gate of an airport terminal using any form of wired or wireless connection to the aircraft 12, or via a manual cache refresh by a crew member of the aircraft 12 carrying on board a CD ROM and inserting it into the cache server.

Figure 3:
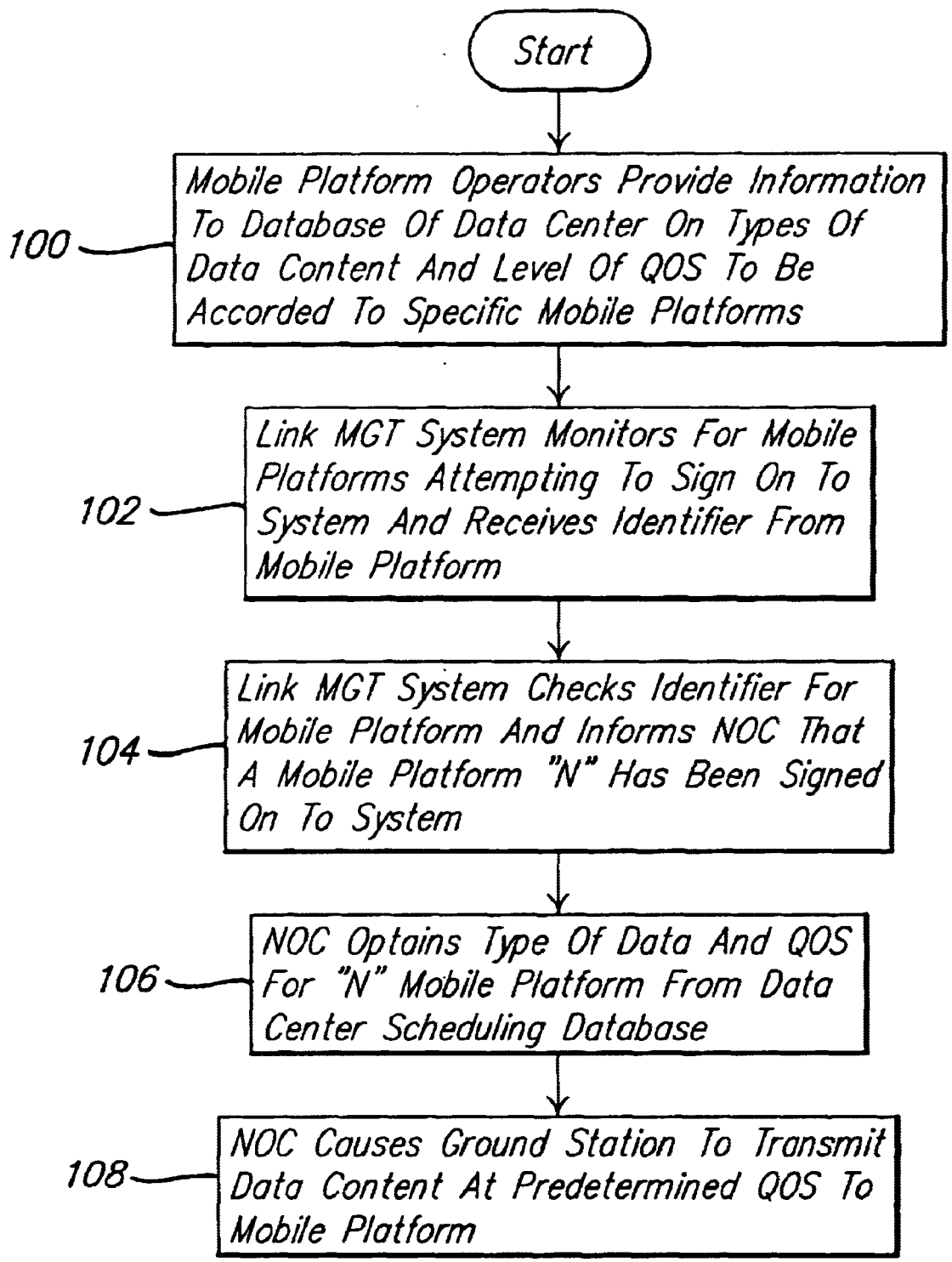
FIG. 3 is a flow chart illustrating the steps performed by the system and method of the present invention in delivering data content to a given mobile platform accessing the system.

Referring to FIG. 3, there is shown a flowchart of the steps of operation the system 10 performs in determining what specific types of data content are to be transmitted to an aircraft 12, along with the level of quality of service designated for that particular aircraft. Initially, as indicated at step 100, mobile platform operators (e.g., airline companies) provide information to the data center 28 as to the tail number of an aircraft that will be accessing the system 10, the specific type of data content to be provided to the aircraft, and the level of quality of service to be provided to the aircraft. Typically, the mobile platform operator will provide this information for a number of aircraft which it operates, and the tail number of each aircraft allows the data center 28 to uniquely identify each aircraft 12 which may access the system 10.

At step 102, the link management system 29 continuously monitors the coverage region 14a for RF signals transmitted from aircraft 12 attempting to log on to the system 10. If any aircraft 12 is attempts to log on, it will transmit an identifier comprising either its tail number, or an Internet Protocol address associated with it, or some other identification code which uniquely identifies it to the link management system 29. The link management system 29 will also immediately inform the NOC 26 when a given aircraft 12 has logged off of the system 10. These operations are further performed in real time such that service to any given aircraft can begin virtually immediately after the aircraft 12 has logged on the system 10.

At step 104, the link management system 29 informs the NOC 26 that a specific aircraft 12 has been logged on to the system 10.

At step 106, the NOC 26 obtains the type of data and level of quality of service from the scheduling database of the data center 28, for the aircraft 12 that has just logged on to the system 10.

At step 108, the NOC 26 then causes the ground station 22a to transmit the specific data content, at the level of quality of service, as indicated from the data center 29 database.

Using the above described method, the present invention can monitor and control the specific types of data content provided to each one of a large plurality of aircraft 12 operating with a given coverage region. In addition, the specific level of quality of service of the transmitted data content can be specified by the aircraft operator such that the system 10 uses different transmission protocols (e.g., point-to-point vs. multicast) to better insure that critical data content is received by any aircraft 12 requiring same.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for managing a delivery of information content by a ground based communication system to each one of a plurality of mobile platforms each having an on-board receiver system to provide customized information content to each said mobile platform; the method comprising the steps of:

creating a database including identifiers uniquely identifying each said mobile platform;

assigning to each of said identifiers a specific type of information content to be provided to each of said mobile platforms and storing said assigned type of information content in said database;

assigning to each of said specific type of information content associated with each said identifier a level of quality of service, said level of quality of service prioritizing each of said specific type of information content, said level of quality of service stored in said database;

updating said database in real time with information as to which ones of said mobile platforms are available for receiving information content; and delivering said specific types of information content to each of said mobile platforms, in real time, according to said priority assigned to each said specific type of information and in accordance with said level of quality of service required by each said mobile platform.

2. The method of claim 1, further comprising the step of having each of said mobile platforms inform a ground based system in communication with said database, in real time, when it is available for service.

3. The method of claim 1, further comprising the step of having each said mobile platform inform said ground based communication system when it is available to receive said information content.

4. The method of claim 1, wherein said mobile platform comprises an aircraft, and where said identifying code comprises a tail number of an aircraft.

5. The method of claim 1, further comprising the step of using a data center to maintain said database, and allowing an operator of one or more of said mobile platforms access to a website in communication with said data center to provide information to said data center as to specific types of said information content to be supplied to said one or more mobile platforms.

6. The method of claim 5, further comprising the step of having said operator supply a designation of a level of quality of service to be provided to each one of said one or more mobile platforms.

7. A method for managing a delivery of information content by a ground based communication system to each one of a plurality of mobile platforms each having an on-board transceiver system to provide customized information content to each said mobile platform, the method comprising the steps of:

creating a database including:
  identifiers uniquely identifying each said mobile platform;
  specific types of information content required by each said mobile platform; and
  a level of quality of service required by each said mobile platform;
  assigning to each of said identifiers one of said specific type of information content;
  assigning to each of said specific type of information content associated with each said identifier one of said level of quality of service, said level of quality of service prioritizing each of said specific type of information content;

having each mobile platform notify a ground based operations system managing said database when it is available for service and when it will no longer be available for service;

using said ground based operations center to continuously update said database, in real time, in response to said notifications from said mobile platforms, as to which ones of said mobile platforms are available for service; and delivering said specific types of information content to each one of said mobile platforms available for service according to said priority assigned to each of said specific types of information and in accordance with said level of quality of service required by each one of said mobile platforms.

8. A method for managing a delivery of information content by a ground based communication system to each one of a plurality of mobile platforms each having an on-board receiver system to provide customized information content to each said mobile platform, the method comprising:

creating in a data center a database including identifiers uniquely identifying each said mobile platform;

assigning to each of said identifiers a specific type of information content to be provided to each of said mobile platforms and storing said assigned type of information content in said database;

assigning to each of said specific type of information content associated with each identifier a level of quality of service, said level of quality of service prioritizing each of said specific type of information content, said level of quality of service being stored in said database;

updating said database in real time with information as to which ones of said mobile platforms are available for receiving information content;

delivering said specific types of information content to each of said mobile platforms, in real time, according to said priority assigned to each of said specific types of information and in accordance with said level of quality of service required by each said mobile platform; and allowing an operator of one or more of said mobile platforms access to a website in communication with said data center to provide information to said data center as to specific types of said information content to be supplied to said one or more mobile platforms and said level of quality of service to be provided.

* * * * *